United States Patent [19]
Dochnahl

[11] 3,744,201
[45] July 10, 1973

[54] MOUNTING SUPPORT AND SEAL FOR WINDOW PANES, ESPECIALLY FOR WINDSHIELDS

[75] Inventor: Hans Dochnahl, Willich, Germany

[73] Assignee: Draftex GmbH, Rhineland, Germany

[22] Filed: Mar. 15, 1971

[21] Appl. No.: 123,960

[30] Foreign Application Priority Data
Mar. 24, 1970 Germany.................. P 20 15 496.5

[52] U.S. Cl. ................................................. 52/400
[51] Int. Cl. ............................................... B60j 1/02
[58] Field of Search............................... 52/397, 400

[56] References Cited
UNITED STATES PATENTS

| | | | |
|---|---|---|---|
| 3,507,085 | 4/1970 | Kruschwitz | 52/627 |
| 3,553,915 | 1/1971 | Passovdy | 52/468 |
| 2,205,538 | 6/1940 | Owen | 52/397 |
| 2,761,535 | 9/1956 | Englehart | 52/400 |
| 2,610,714 | 9/1952 | Bradley | 52/400 |
| 2,793,071 | 5/1957 | Meyer | 52/400 |
| 3,504,471 | 4/1970 | Aspaas | 52/400 |
| 3,527,010 | 9/1970 | Brezezinski | 52/397 |

FOREIGN PATENTS OR APPLICATIONS

| | | | |
|---|---|---|---|
| 979,707 | 1/1965 | Great Britain | 52/400 |
| 956,523 | 4/1964 | Great Britain | 52/397 |

*Primary Examiner*—John E. Murtagh
*Attorney*—Ernest F. Marmorek

[57] ABSTRACT

A mounting support and seal for windows and windshields in motor cars is disclosed where a U-shaped edge covering strip is clamped to a flange that is integral with the car body. A U-shaped shoulder extends at right angle from the lower portion of the outer arm of the edge covering strip. A slightly bent holding lath has a projecting central tongue adapted for being plugged into the groove of the U-shaped shoulder to form a joint therewith. The windshield seats on the upper arm of the shoulder and clamps by its weight the toothed groove-tongue joint together. Sealing strips are provided from each side of the windshield between the top portion of the edge covering strip and the end of the holding strip.

10 Claims, 1 Drawing Figure

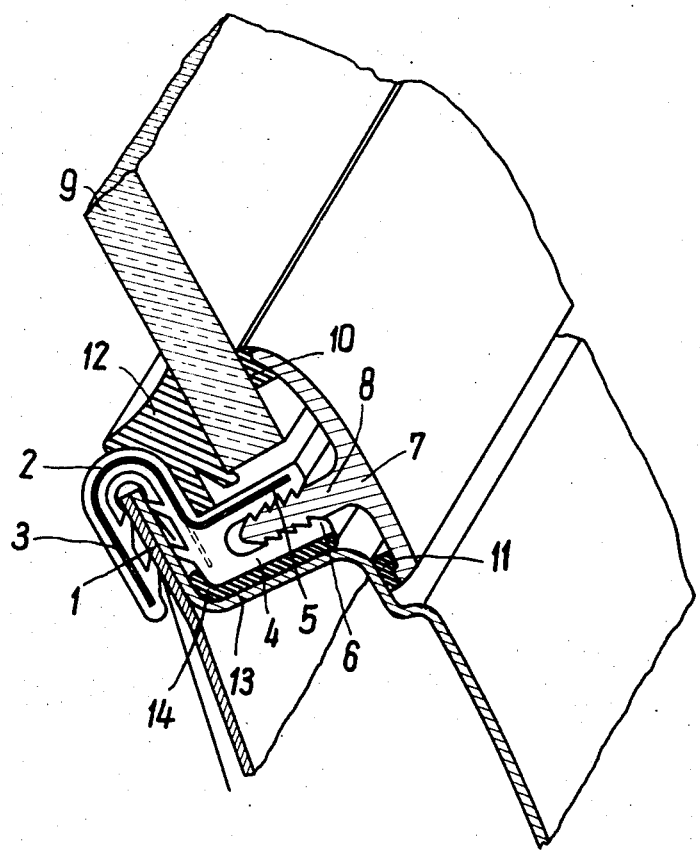

MOUNTING SUPPORT AND SEAL FOR WINDOW PANES, ESPECIALLY FOR WINDSHIELDS

BACKGROUND OF THE INVENTION

This invention relates generally to fixing of window panes in window openings.

More particularly, this invention relates to a safety mounting support and seal for a windshield in a motor car.

For the sake of safety, windshields in motor cars are to be mounted during the assemblage in such a manner as to prevent their dislocation in the direction of travel even if the car is subject to an excessive and abrupt speed change, such as the case may be particularly in collisions.

To solve the above problem, it has been already suggested, among others, to employ a special adhesive for cementing the windshield to its frame, or for cementing the frame to a rigid part of the motor car body. Such prior art measure, however, has the disadvantage that when replacing the windshield in a service workshop, for example, a suitable agent for dissolving the old fixing cement and a special cement for providing a new attachment, are usually not at hand.

SUMMARY OF THE INVENTION

It is, therefore, an object of this invention to provide a window pane attachment which avoids the disadvantages of the prior art.

More particularly, an object of this invention is to provide a windshield mounting support which insures the windshield against displacement even at extreme accelerations.

Another object of this invention is to provide a mounting support and seal for window panes or windshields which can be easily mounted in and demounted from the window opening.

In accordance with the present invention, the above objects are attained by providing a mounting support and seal arrangement for window panes, especially windshields in motor cars, characterized by th following parts.

a. a stepped supporting flange affixed to the car body and extending substantially parallel with the periphery of the window opening.

b. an edge covering strip of a U-shaped profile, made of hard rubber or plastics with a U-shaped reinforcing metal insert embedded therein, is seated on the flange. The facing inside walls of the U-shaped strip are provided with inwardly bent retaining ribs or teeth for clamping the side walls of the aforementioned supporting flange; a lower portion of the outer arm of the edge covering strip is extended at a right angle to form a projecting shoulder of a U-shaped cross-section; the shoulder is seated on the step of the supporting flange and the inside walls of its longitudinal groove are also provided with clamping ribs or teeth.

c. a holding a decorative lath or strip of a slightly bent profile; the lath is integral at its central portion facing the car interior with a projecting toothed tongue to provide a groove tongue joint with the groove of the above mentioned, at right angle projecting shoulder of the edge protecting strip.

It is advantageous to make the outwardly projecting shoulder of a material that is more resistant and rigid than that of the remaining portion of the edge covering strip. This shoulder can be attached to the arm of the U-shaped edge covering strip by welding, for instance. The shoulder is also reinforced preferably by a correspondingly bent portion of the reinforcing metal insert.

BRIEF DESCRIPTION OF THE DRAWING

The principle as well as other details of this invention will now be described in conjunction with the accompanying drawing, the single FIGURE of which is a cutaway perspective view, partly in section, of a preferred embodiment of the windshield mounting support and seal of this invention on a car body.

DETAILED DESCRIPTION

With reference to the single FIGURE, the periphery 13 of window opening in a car body is provided with a projecting flange 1 integral with the rim of the car body. A U-shaped edge covering strip 2 of rubber or plastic is sealed in a conventional manner on the edge of the flange 1. The inner opposite walls between the arms of the U-shaped strip 2 are provided with retaining ribs which clamp the side walls of the flange 1 at an oblique angle.

According to this invention, a lower portion of the outer arm of the edge covering strip 2, facing the windshield 9, is outwardly extended substantially at the right angle to form a projecting shoulder 4. The shoulder 4 also has a U-shaped profile with retaining teeth-like ribs in the resulting groove 6. The shoulder 4 can be made preferably of a harder material than that of the edge covering strip 2, and can be attached to the latter by welding, for example. A conventional reinforcing metal strip 3 is embedded in the body of the edge covering strip 2. A portion 5 of an arm of the metal strip 3 in the region of the shoulder 4 is bent and embedded in the upper arm of the projecting shoulder 4 supporting the windshield 9. The lower arm of the shoulder 4 rests upon a rigid step of the periphery 13 of the car body. From the outside, the windshield 9 is held in position by a holding, decorative lath or strip 7 having a slightly bent profile and a projecting toothed tongue 8 at the central area of the inside surface. The tongue 8 is inserted into the toothed groove 6 to produce a groove-tongue junction whereby the teeth-like ribs both in the groove 6 and on the tongue 8 are clamped by the effect of weight of the windshield 9 so that the holding strip 7 and thus the windshield 9 cannot be displaced even at excessive shocks. The holding strip 7 as well as the retaining tongue 8 are made of metal or of a hard, abrasion resistant plastic. The inwardly bent edges of the holding strip 7 abut against the windshield 9 and against a steep portion of a step in the car body 13, respectively. It is recommended to provide both ends of the holding strip 7 with resilient sealing strips 10 and 11. Similarly, a resilient sealing strip 12 is inserted between the upper portion of the edge covering strip 2 and the lower part of the windshield 9, counteracting the pressure of the holding strip 7.

Finally, a resilient clamping strip 17 is disposed between the lower arm of the projecting shoulder 4 and the supporting horizontal portion of the step in the car body 13. The flange 1 is firmly attached, preferably by welding, to step-like shaped peripheral portion of a window opening in the car body.

The above-described preferred embodiment of this invention insures not only a window pane or windshield mounting support that meets all safety requirements for motor cars but provides also a considerably simplified mounting and dismounting operation.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A mounting support and seal for a windwhield of a motor car, comprising:
supporting flange means fixedly connected to the periphery of a windshield opening,
a U-shaped edge-covering strip of resilient material seated on and clamped to said supporting flange means, a portion of said U-shaped edge-covering strip extending outwardly substantially at a right angle to form a projecting shoulder for supporting said windshield, said shoulder having at its free end a longitudinal retaining groove the walls of which being provided with longitudinal ribs of tooth-like profile;
a holding lath having at its central portion a projecting retaining tongue, the side walls of said tongue being provided with ribs of tooth-like profile similar to that of said longitudinal ribs and complementarily engaging therewith, whereby one edge of said holding lath abuts against one side of said windshield to press the opposite side of said windshield against the upper portion of said edge-covering strip, and the other edge of said holding lath abuts against said periphery of said window opening.

2. A mounting support and seal according to claim 1, wherein said projecting shoulder is of more rigid material than that of said U-shaped edge-covering strip.

3. A mounting support and seal according to claim 2, wherein said projecting shoulder is fixedly connected to said edge-covering strip by welds.

4. A mounting support and seal according to claim 2, further comprising a reinforcing metal insert embedded within said edge-covering strip and within the upper arm of said shoulder.

5. A mounting support and seal according to claim 1, wherein the edges of said holding lath are slightly bent towards said projecting tongue.

6. A mounting support and seal according to claim 5, further comprising outer sealing strips disposed at said edges of said holding lath, respectively.

7. A mounting support and seal according to claim 1, further comprising inner sealing strip disposed between said edge-covering strip and said windshield.

8. A mounting support and seal according to claim 1, wherein said supporting flange is integral with a step-like peripheral portion of said window opening, said shoulder seating on said step-like peripheral portion of said window opening.

9. A mounting support and seal according to claim 8, further comprising a resilient clamping strip disposed between the lower arm of said shoulder and said step-like peripheral portion of said window opening.

10. A mounting support and seal according to claim 1, wherein the opposite walls of said retaining groove and tongue, respectively, are provided with a plurality of mutually fitting teeth.

* * * * *